April 2, 1968     J. CAMPBELL ET AL     3,376,154
CARBON PAPER AND METHOD FOR THE MANUFACTURE THEREOF
Filed Sept. 17, 1963     2 Sheets-Sheet 1
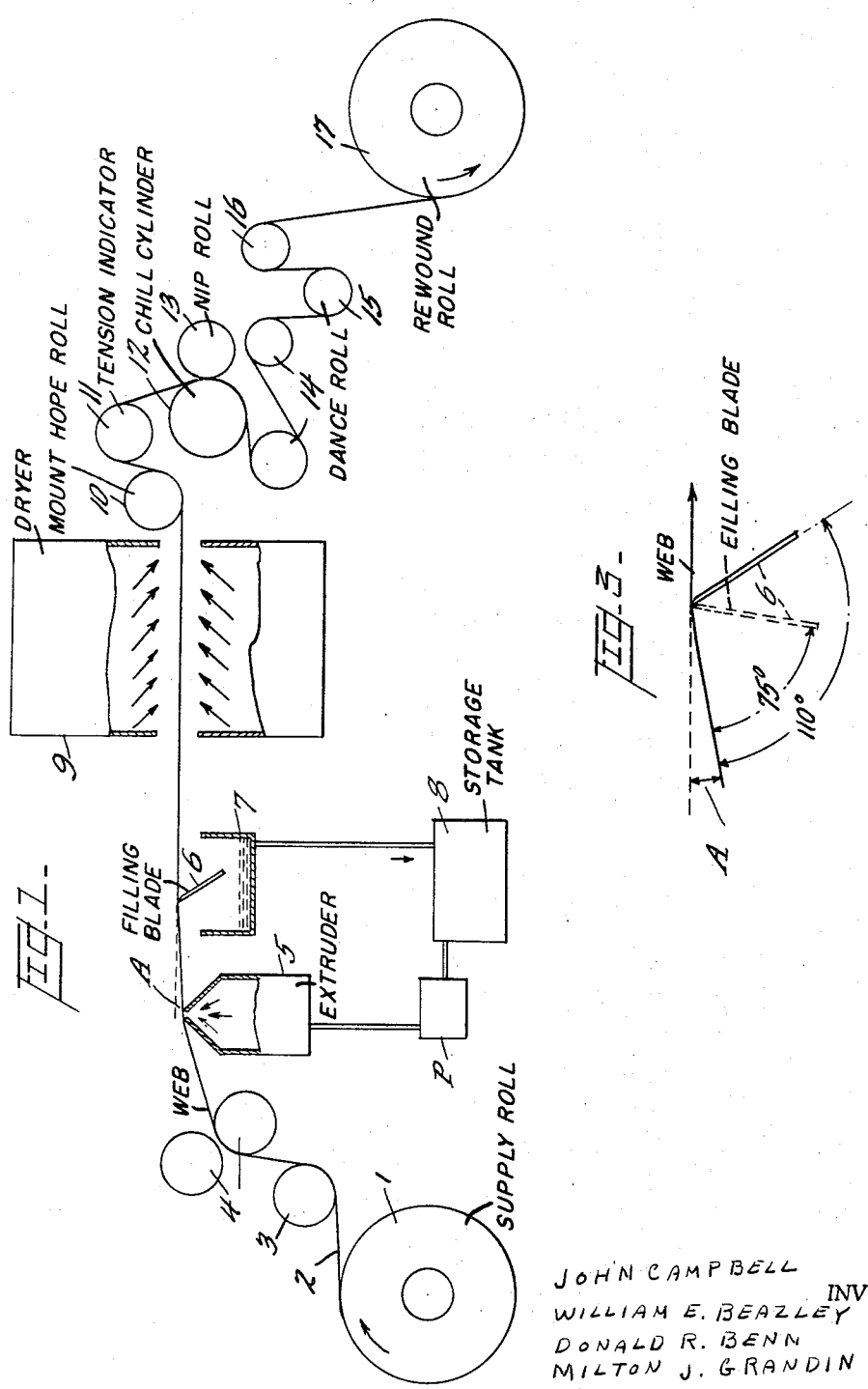
JOHN CAMPBELL
WILLIAM E. BEAZLEY
DONALD R. BENN
MILTON J. GRANDIN
INVENTOR
BY Watson, Cole, Grindle & Watson
ATTORNEY

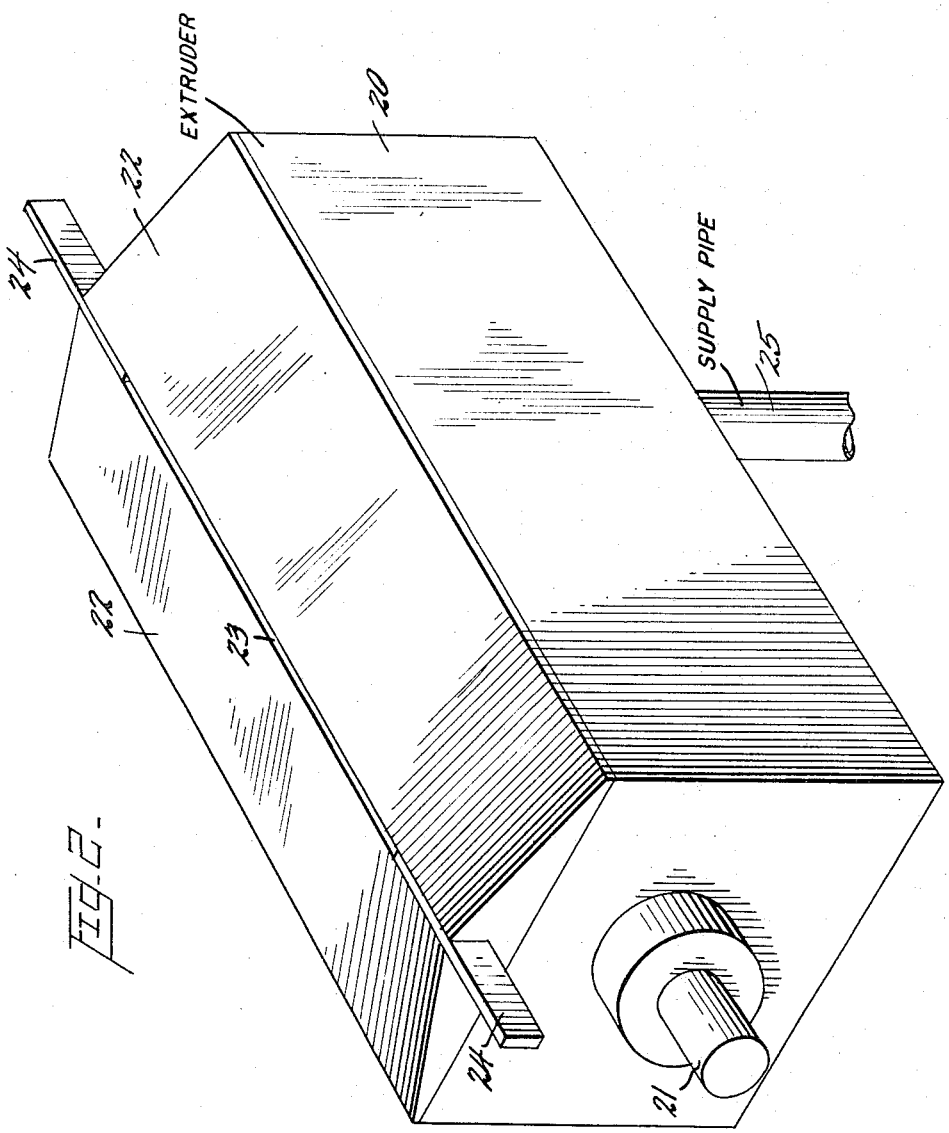

United States Patent Office 3,376,154
Patented Apr. 2, 1968

3,376,154
CARBON PAPER AND METHOD FOR THE
MANUFACTURE THEREOF
John Campbell, Kenmore, and William E. Beazley, Lewiston, N.Y., Donald R. Benn, Niagara Falls, Ontario, Canada, and Milton J. Grandin, Niagara Falls, N.Y., assignors to Moore Business Forms, Inc., Niagara Falls, N.Y., a corporation of Delaware
Filed Sept. 17, 1963, Ser. No. 309,571
13 Claims. (Cl. 117—364)

This invention relates generally to an improved carbon paper and to a method for manufacturing same and, more particularly, to carbon paper free of objectionable streaking and pin-holing characteristics.

Carbon paper is well known as a duplicating material which is used with either a manual writing instrument or a typewriter to produce one or more copies of the original document simultaneously. It is composed basically of a relatively thin tissue paper, generally produced from either sulphate or sulphite pulps and weighing usually between 7.0 and 17.0 pounds per ream, a ream being 500 sheets, of 24 x 36-inch paper. The extremely light-weight paper is usually expensive and therefore not frequently used.

In manufacturing the carbon paper, the tissue paper is coated on one side with a carbon ink compound comprising a pigment or dye suspended in a suitable thermoplastic coating material. The coating is usually applied in a molten condition to the paper by a coating machine equipped with rollers which are partially immersed in the molten mixture and upon rotation apply a thin film of the carbon ink to the surface of the continuously moving paper web.

The use of thin tissue paper as the support for the carbon ink composition presents a problem to the carbon paper manufacturing industry, since during the coating operation, the carbon ink composition has a tendency to pass through the porous paper to the reverse side, causing spotting and streaking, commonly referred to in the trade as "pin-holing." Any carbon ink on the reverse side of the tissue paper is undesirable since when in use the carbon paper will duplicate written matter on the reverse side of the original copy as well as on the duplicate copy.

Various steps have been taken to eliminate pin-holing, with varying degrees of success. The tissue paper has been made either heavier or denser and also has been produced from shorter hydrated fibers. However, these steps generally increase the cost of the paper and in addition may reduce its strength. Moreover, longer fibers produce a more desirable tissue paper characterized, for example, by greater resistance to tearing.

Another step which has been taken to avoid pin-holing has been to coat a surface of the tissue paper with various materials before applying the carbon ink composition. Here again, however, the thickness and the stiffness of the paper is substantially increased, which decreases the manifolding properties of the carbon paper.

Attempts have been made to use a more viscous carbon ink composition which is less likely to pass through the fine pores of the tissue paper. The viscosity may be increased, for instance, by maintaining the coating material at a lower than normal temperature during the coating operation. However, a disadvantage to this method is that the speed of the coating operation must be substantially reduced, thus increasing production costs.

An object of this invention is an improved carbon paper which is free of objectionable spotting or streaking on the side opposite the coating.

A further object is a method of producing an improved carbon paper which is free of objectionable spotting or streaking on the side opposite the coating but which is inexpensive to manufacture.

A still further object of the invention is a method for closing pinholes in thin tissue paper.

Another object of this invention is a thin tissue paper which is relatively non-porous and is at least substatially free of pinholes.

Another object of the invention is a thin tissue paper in which the pores have been filled without substantially reducing its tensile strength or altering its thickness and stiffness.

Still another object of this invention is a thin tissue paper in which the pores have been filled with a resinous composition which is not itself in the form of a continuous film.

Other objects of the present invention will be readily apparent from the following detailed description and the accompanying drawings in which:

FIGURE 1 is a schematic diagram of a tissue paper treating process according to this invention;

FIGURE 2 shows in some detail the extruder used in in the apparatus of FIGURE 1; and FIGURE 3 is a schematic diagram showing the angular relationship of the filling blade to the web and the web to the horizontal.

In accordance with this invention, porous, lightweight tissue paper is first treated with a resinous filler material prior to the application of the usual carbon ink composition. The resinous filler material is applied to one side of a continuously moving web of the paper and then is forced into the pinholes in the paper, excess filler being substantially scraped off the surface of the paper which is then dried. Pinhole filling and scraping are accomplished in a single operation by a filling blade maintained at a predetermined angle with respect to the moving web.

Either natural or synthetic thermoplastic materials may be used as fillers. Synthetic materials soluble in a volatile solvent such as methyl alcohol may be used; an example is polyvinyl acetate dissolved in methyl alcohol. Other alcohol-soluble materials, such as a protein marketed under the trade name "Zein" by Corn Products Company, are also successful as fillers for tissue paper pinholes. Among the naturally occurring materials are wood rosin and processed wood rosin, such as hydrogenated wood rosin.

A preferred filler material is a high melting, complex mixture of resins and/or resin acids dervide from Southern Pine wood. This material is marketed by various companies, including Newport Industries, a division of Hayden Newport Chemical Corporation, under the trade name "Solo," and Hercules Powder Company under the trade name "Vinsol." These materials are derived from the softened extract of rosin obtained from pine stumps and consist chiefly of highly oxidized abietic and polymerized abietic acids, along with smaller amounts of polyphenols, ligneous materials, terpenes, and unoxidized abietic acid. Usually the pine wood is extracted with a coal tar hydrocarbon which is then evaporated and the rosin residue is extracted with a light petroleum hydrocarbon to recover the preferred pine wood derivative.

The preferred filler material is prepared for use in the process of the present invention by dissolving it in methyl alcohol or a similar volatile solvent which does not materially reduce the strength of the tissue sheet to obtain a solution having a final viscosity of preferably between 40 and 50 centipoises at 24° C. The exact viscosity will depend on the porosity of the tissue paper being filled. The amount of solvent required to obtain the desired viscosity will depend on the particular filler material used. In the case of the preferred pine wood derivative, the solution ranges from 30 to 50 percent by weight of methyl alcohol. The solvent used may contain to about 1 percent water without having a deleterious effect on the tissue paper.

The resin may optionally contain a plasticizer and in the case of the preferred pine wood derivative, a good plasticizer is oleic acid in an amount ranging from 0.1 to 1.5 percent by weight. Oleic acid may be conveniently added as tall oil, which contains about 50 percent resin acids and 50 percent oleic and linoleic acids. Plasticizer-containing resins have less tendency to drop out of the pores in the treated tissue paper.

FIGURE 1 is a diagrammatic sketch showing the tissue filling operation according to the invention. The tissue web 2 unwinds from the supply roll 1 and passes around a guide roll 3 and between a pair of nip rolls 4. Since the web tension must remain substantially constant, the nip rolls are required to eliminate any wide variation in web tension caused, for example, by the use of supply rolls which are out of round.

After leaving the nip rolls 4, the tissue paper web is maintained nearly horizontally and a slight excess of filling solution is applied to either side of the web by means of an extruder 5, which will later be described in greater detail. The paper then comes in contact with a filling blade 6 which forces the filler solution into the pinholes and interstices between the fibers and scrapes off any of the solution left on the surface of the web to the extent that only the surface fibers are stained. The excess solution drops into a trough 7 and flows into a storage tank 8 where it is filtered. A viscosity regulator may be employed to continuously determine the viscosity of the solution in the storage tank and add additional solvent as necessary to replace that which has evaporated during the treating operation. The filler solution, properly adjusted as to viscosity, is then pumped by pump P back to the extruder 5 for further use.

An important feature of the invention is the filling blade which is inclined with respect to the oncoming tissue paper at an angle of apprroximately 75 to 110 degrees as is diagrammatically shown in FIGURE 3. The precise operating angle of the blade, to give maximum filling of the pinholes, will depend on the size and number of pinholes of the particular tissue paper. This angle of the scraper blade to the tissue paper is important to the proper application of the filler solution. If the angle is too small, the filler solution will spray through the paper and leave the pinholes unfilled. On the other hand, if the angle is too great, the filling material will not be forced into the pinholes but will merely be scraped off the surface. The presence of the spray indicating too small an angle of inclination may be easily detected by holding a sheet of white paper close to the top side of the tissue paper adjacent to the filling blade. If spray is occurring, the white paper will become coated in a relatively short time. The proper angle may be determined during the operation of the filling process by slowly increasing the angle of the blade to the tissue paper until no filling solution is sprayed through the paper. This is the optimum blade angle to insure proper filling of the pinholes.

The design of the filling blade itself may vary though it must have sharp edges. An example of a satisfactory blade is the standard double bevelled cutting rule having a thickness of about 0.028 inch and a bevelled edge 1/8 inch long. The two sides of the blade make an angle of about 13 degrees at the point. The oncoming tissue paper should meet the sharp edge of the blade at an angle of between 10 and 20 degrees below the horizontal, as shown at A in FIGURE 1. The optimum angle is generally about 16 degrees from the horizontal. The tension of the continuous web of tissue paper at the blade during the filling and scraping operation is preferably between 1½ and 2½ lbs. per linear inch and it is important to the success of this process that the tension be kept constant. The method of determining web tension will be described later. The angle or "wrap" of the tissue paper passing over the blade and the tension on the paper are important to the filling process and the removal of the surplus filling material from the surface of the paper.

After leaving the filling blade, the tissue web passes into a dryer 9, where it floats between a series of heated air jets impinging on the top and bottom surfaces of the web. It is important that the sheet does not touch anything until the filling material in the pinholes is dry. The drying temperature may vary between 200 and 300° F., depending on the speed at which the web passes through the dryer. Care must be taken that the filling material is not over-dried, since it then becomes powdery and tends to fall out of the pinholes in the tissue. Over-drying is easily detecting by checking for powder dropping from the paper by rubbing with the hand at the exit end of the dryer. Since the filler solvent is quite volatile at the drying temperatures used, the tissue paper will dry readily, permitting the paper web to pass through the dryer at very high rates of speed.

After leaving the dryer section, the web passes under a "Mount Hope" roll 10 to remove any wrinkles which may form during the drying operation. This roll is a revolving bowed roll which will smooth the web held tightly against it. The web then passes around roll 11, which constitutes a tension indicator, and then around a chill cylinder 12. A nip roll 13 holds the web securely against the chill cylinder 12 in order to maintain a substantially constant tension at the point of application. The tension indicator 11 allows the operator of the machine to maintain the required constant tension on the web. In the alternative, the tension indicator may automatically control the web tension. The web then passes over guide rolls 14, under a dance roll 15, and over an additional guide roll 16 before it is rewound on to a roll 17. The dance roll 15 automatically controls the web tension in the rewound roll.

FIGURE 2 is a detailed drawing of the extruder 5. It consists of a generally rectangular container 20 provided on each end wall with a threaded boss 21 which fits into a supporting bracket (not shown). The upper end of the container is closed by cover plates 22. The thickness of each of the plates increases toward the center so as to form a low ridge. An example are plates having a thickness at the edges of 1/3 inch and a thickness in the center of 7/8 inch. A slot 23 is left between the inner edges of the two cover plates, the length of which can be adjusted to fit different widths of tissue webs by means of rectangular bars 24 slidably arranged at each end of slot 23 and which can be slid in or out to regulate the length of the slot. The length of the slot will, of course, be determined by the width of the tissue paper being coated. Each of the cover plates 22 is slid tightly against the sides of the bars and locked in position by means of screws.

Bars of different thicknesses may be used in the extruder to regulate the quantity of filling material going on to the surface of the moving paper tissue. The quantity of material, of course, will depend on the speed of the tissue paper. It is important that the quantity put on be sufficient to fill the holes and the surplus be kept to a minimum. The ideal method of operation would be to extrude just sufficient filling material to fill the pinholes in the tissue and have no surplus. It is important to keep the surplus to a minimum consistent to filling the pinholes in the tissue.

The bottom of the container 20 is fitted with an inlet pipe 25 communicating with the pump P and through which the alcoholic filler solution is pumped into the container and through the slot 23 onto the paper web. The rate of flow of the solution through the slot 23, which constitutes a discharge orifice for the extruder 5, is determined by the pressure applied to the solution on the discharge side of pump P. The continuous web of tissue paper moving over the slot opening is immediately partially flooded with the solution maintained under pressure in extruder 5. Care must be taken that the hydraulic pressure is not excessive forcing the filling solution through the tissue sheet without filling the pinholes.

The partially flooded web then passes on to the sharp-edged filling blade 6 where the solution is forced into the pinholes and the excess solution is essentially scraped completely off the surface of the web, leaving a film-free surface. As was stated earlier, the pool of solution in front of the blade should be just sufficient to fill the pinholes and leave a minimum amount to scrape off the surface. This may be controlled by the thickness of the bars 24 and the hydraulic pressure of the filling solution against the paper.

After the tissue paper pinholes have been filled and the paper dried in the manner described above, the usual carbon ink vehicle may be applied. The carbon ink comprises one or more natural or synthetic waxes and ink oil which have been colored with a pigment or dye, such as carbon black or methyl violet. The carbon ink composition is applied to the filled tissue paper in a molten state, usually above 170° F., after which the coating is spread evenly on the tissue surface by a blade or roller and then allowed to cool. The composition and mode of application of the carbon ink vehicle form no part of the present invention and may be selected according to the knowledge of the art.

An improved carbon paper is produced according to the above-described process. The pinhole filling of the tissue paper with the above-described thermoplastic materials prior to application of the carbon ink coating eliminates any strike-through of the ink with the resulting spotting and streaking without detracting from the duplicating qualities of the carbon paper. Secondary benefits resulting from the novel process include the facts that less carbon ink is required since there is little if any absorption by the paper and the carbon ink coating process may be conducted at a considerably faster rate; also, the release qualities of the carbon ink from the filled paper are improved.

We claim:

1. In a process for the manufacture of carbon paper having a carbon ink coating on a tissue paper support, the improvement of preparing said tissue paper having pinholes therein for reception of said coating comprising the steps of applying a composition comprising at least one thermoplastic resin and a volatile solvent to the underside surface of a substantially horizontal continuously moving web of said tissue paper maintained under tension, said composition having a viscosity between 40 and 50 centipoises at 24° C., filling said pinholes and simultaneously removing said composition from said underside surface of said web by passing said web across the sharp edge of a blade at an angle of between 75 and 110° with respect to the oncoming web of tissue paper, such that said composition does not spray through the pores of said paper and, drying said web, whereby said pinholes are filled with said resin.

2. In a process as claimed in claim 1 wherein said composition further comprises a plasticizer.

3. In a process as claimed in claim 1 wherein said composition comprises the mixture of resins extracted from pine wood rosin and a volatile solvent.

4. In a process as claimed in claim 3 wherein said composition further comprises 0.1–1.5 percent by weight of oleic acid.

5. In a process as claimed in claim 3 wherein the concentration of said volatile solvent in said composition is between 30 and 50 percent by weight.

6. In a process as claimed in claim 3 wherein said volatile solvent is methyl alcohol.

7. In a process as claimed in claim 1 wherein said web of tissue paper approaching said blade is maintained at an upward inclination of between 10 and 20° from the horizontal.

8. In a process as claimed in claim 7 wherein said angle of upward inclination of said tissue paper is 16° from the horizontal.

9. In a process as claimed in claim 3 wherein said web is dried at a temperature of between 200 and 300° F.

10. In a process as claimed in claim 1 wherein said tension on said tissue paper is maintained between 1½ and 2½ lbs. per linear inch.

11. In a process as claimed in claim 1 wherein said tissue paper weighs between 7.0 and 17.0 lbs. per ream of 24 x 36 inches.

12. An improved carbon paper comprising tissue paper weighing 7.0 to 17.0 lbs. per ream of 24 x 36 inches, the pinholes thereof being substantially filled with a resinous thermoplastic composition such that said tissue paper is substantially non-porous and both surfaces thereof are substantially free of a continuous coating of said composition, said composition consisting of a combination of resinous materials extracted from pine wood rosin and a plasticizer, and a carbon ink material coated on one surface thereof, said composition in said pinholes preventing penetration of said paper by said ink, whereby the reverse surface of the carbon paper is free of said carbon ink material.

13. An improved carbon paper as claimed in claim 12 wherein the plasticizer in said resinous thermoplastic composition comprises oleic acid, said oleic acid being present in said composition to the extent of 0.1 to 1.5 percent by weight.

References Cited

UNITED STATES PATENTS

| | | | |
|---|---|---|---|
| 1,565,310 | 12/1925 | Dixon | 117—37 X |
| 1,944,835 | 1/1934 | Boyers | 117—111 |
| 1,972,011 | 8/1934 | Deplanche | 117—36.1 |
| 2,423,555 | 8/1947 | Ender | 117—111 |
| 2,606,775 | 8/1952 | Newman | 117—36.4 |
| 2,824,815 | 2/1958 | Downs et al. | 117—36.4 |
| 2,840,138 | 6/1958 | Johnston et al. | 117—158 |

MURRAY KATZ, *Primary Examiner.*